United States Patent [19]
Labranche

[11] Patent Number: 5,226,709
[45] Date of Patent: Jul. 13, 1993

[54] LIGHTING ARRANGEMENT FOR CHRISTMAS TREES

[76] Inventor: Gérard A. Labranche, 965, Lambert, St. Francois, Laval, Que., Canada, H7A-2G5

[21] Appl. No.: 916,690
[22] Filed: Jul. 22, 1992
[51] Int. Cl.[5] ............................................. F21V 8/00
[52] U.S. Cl. ..................................... 362/32; 362/123; 362/806
[58] Field of Search ............... 362/32, 122, 123, 806, 362/320

[56] References Cited

U.S. PATENT DOCUMENTS

| | | | |
|---|---|---|---|
| 3,536,908 | 10/1970 | Oster | 362/123 |
| 3,564,233 | 2/1971 | Cox et al. | 362/32 |
| 3,641,335 | 2/1972 | Wall | 362/123 |
| 3,766,376 | 10/1973 | Sadacca et al. | 362/123 |
| 4,777,571 | 10/1988 | Morgan | 362/123 |

Primary Examiner—Richard R. Cole

[57] ABSTRACT

A decorative lighting device for Christmas trees having a rigid branch and a set of flexible branches all made of light conductive material. The flexible branches are attached to the rigid branch at a position intermediate their top and bottom ends. The flexible branches are sized accordingly so that at least a portion of the branch will self supportingly project laterally from the rigid branch. A light source projects light onto the bottom end of the branches. The branches have a diameter such that light travelling through them will substantially diffuse radially along their entire length as well as diffuse axially at the top end. A colored disc positioned between the light source and the branches is adapted to create light color patterns.

11 Claims, 4 Drawing Sheets

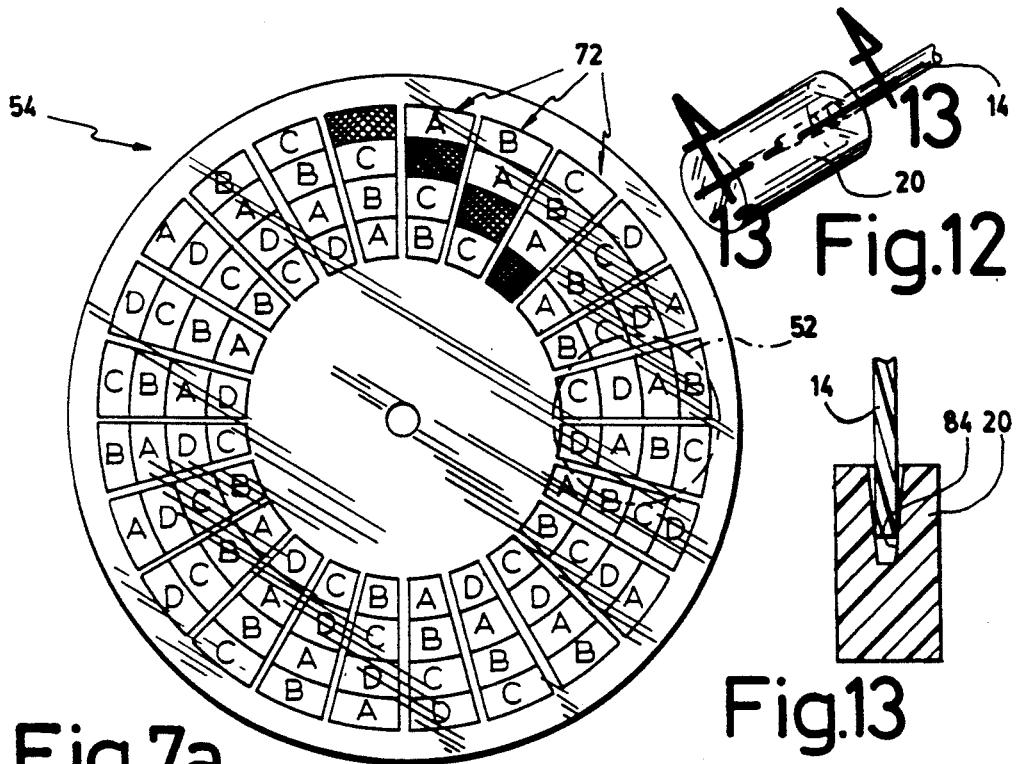
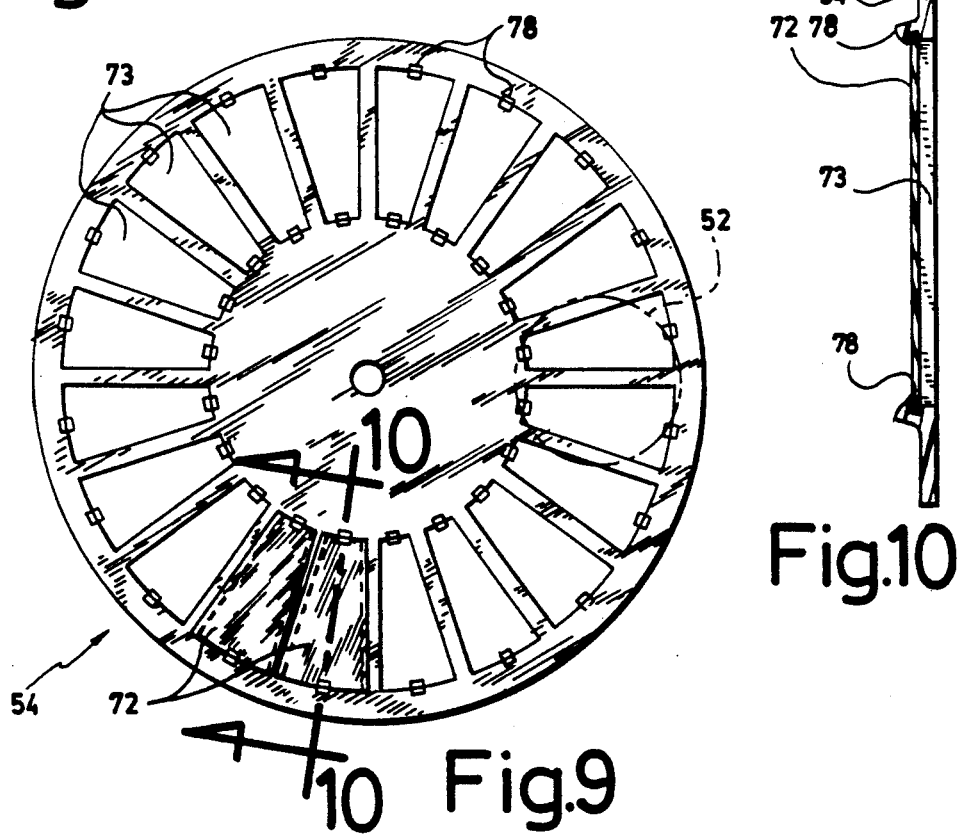

LIGHTING ARRANGEMENT FOR CHRISTMAS TREES

FIELD OF THE INVENTION

The present invention relates to the field of light conductive rods and more particularly to a decorative structure adapted to be used as a Christmas tree decoration using light conductive rods.

BACKGROUND OF THE INVENTION

A search amongst prior patents has revealed numerous documents disclosing structures pertinent to the field. U.S. Pat. No. 3,431,410 to Dolan et al and, U.S. Pat. No. 3,532,874 to Rosenost both disclose a bundled group of optic fibers held together at one end. A light source is placed at the grouped end. The light travels through each fibre substantially without dispersing and emerges at the other end to produce a set of pin point like lights.

U.S. Pat. No. 1,921,614 to Fry Jr., U.S. Pat. No. 2,227,861 to Petrone and U.S. Pat. No. 3,465,139 to Segal all show elongated glass or lucite rods adapted to conduct light through the branches of a Christmas tree in order to provide bulb like Christmas lights for the tree.

U.S. Pat. No. 3,564,233 to Cox et al shows a system employing separately encapsulated optical fibre conduits which are branched off from a central optical fibre bundle which is positioned along the trunk of a Christmas tree. The light which is transmitted through the central bundle of fibers illuminates translucent shapes mounted on the terminal ends of the fiber.

The above mentioned structures do not provide what is referred to at line 49 of U.S. Pat. No. 3,766,376 has a spray like effect. Both U.S. Pat. Nos. 3,766,376 and 3,624,385 disclose structures which attempt to provide such a visual effect.

However, the structure described in U.S. Pat. No. 3,624,385 requires numerous electrical connections, while the structure disclosed in U.S. Pat. No. 3,766,376 requires a set of ties for tying the bundle of optical fibers to the trunk of the tree. Both the electrical connections and the ties are cumbersome and time consuming to install.

U.S. Pat. No. 3,766,374 discloses a decorative structure using optical fibers which are linked to structural rods while U.S. Pat. No. 3,878,503 discloses a structure using optical fibers which are confined and supported by a bendable wire spirally wound around a plurality of fibers.

The U.S. Pat. No. 4,364,102 to Huppert and Castoro discloses a structure which attempts to eliminate the need for structures required to bundle a mass of fragile optical fibers and eliminates the safety hazard ever present with the use of large amounts of electrical wiring to provide illumination, by providing an internally lighted Christmas tree which transmits the light to the exterior of the display.

The structure proposed by the present invention also eliminates the need for structural reinforcement. The new structure is adapted to produce the spray-like effect without the use of any specific complicated electrical wiring or structural reinforcement. The new structure uses "light pipes" which are both self supporting and bendable.

The entire length of the each fibre is specifically adapted to glow radially thus providing an enhanced visual effect. Furthermore, the present invention proposes a structure which can be readily customized in any shape, size and nature. The installation procedure is reduced to a single step operation.

Instead of proposing a fixed shape artificial tree as is the case with U.S. Pat. No. 3,465,139 and U.S. Pat. No. 4,364,102 which, once purchased, offer only a given shape and size and which proved to be relatively complex, the present invention offers a decorative structure which can create a variety of decorative pattern and which is adaptable to a variety of trees.

The present invention provides the spray light effect without the numerous connections of the structure described in U.S. Pat. No. 3,624,385 or the numerous ties required by the structure described in U.S. Pat. No. 3,766,376, thus facilitating installation. The present invention also eliminates the need for obstructing supporting structures such as the longitudinal rods of the structured described in U.S. Pat. No. 3,766,374 and the spirally wounded wires of the structure described in U.S. Pat. No. 3,878,503.

The invention utilized an optical principle often referred to as trans-illumination or more commonly, as a "light pipe". The phenomena is characterized by the fact that light rays introduced into one end of a relatively smooth article made of glass or certain type or transparent plastics such as P.M.M.A. will be transmitted therealong, without diffusion until the light rays encounter the translucent edge of the article or some other light diffusing obstruction. Theoretically, if the transparent light transmitting material is of uniform density, free from imperfections and the outer surface is relatively smooth, the light rays will not be visible when the article is viewed transverse to the path of travel of the light rays. However, the light rays will travel the length of the article and will illuminate the end thereof or any translucent obstruction which may defuse the rays. This is true irrespective of the colour of the light and a translucent obstruction placed in the path of the light will glow as if it were the source of light.

Glass and most clear plastics, especially those of the methyl methacrylate type, often designated as "lucite" process this end or edge lighting ability and may be used in the construction of the invention.

All the invention described in the above mentioned patents were intended to optimize the end lighting effect. The present invention departs from the spirit of these previously mentioned inventions by proposing a structure adapted to provide a radial diffusion transverse to the path of light along the entire length of each individual branch as well as an axial diffusion at the distal end of each branch.

Since the branches of the present invention are free from any obstructing structural reinforcing components, the radial glow of the branches create a pleasing asthetical effect along their entire length.

The invention is thus versatile, easy to install, structurally simple and asthetically optimal. It provides both a radial diffusion along the entire length of each fibre and an axial diffusion at a distant tip of each fibre which can be connected to a terminating structure which provides a bulb like effect.

These advantages are obtained by using a set of "light pipes" which are optimally sized and optically coupled to a suitable light source.

Most structures described in the previous patents used fibers having a diameter too small to provide the advantages offered by the present invention. Most of them used optical fibers which have a small diameter in order to ensure that the light rays are substantially parallel to the fibre thus minimizing refraction. These fibers are designed to carry light over a great axial distance. The use of fibers having a larger diameter by the present invention allows both structural sufficiency and enhance radial diffusion since some of the light rays will eventually reach the diffraction angle of the material. The larger fibers used with the present invention diffused large amounts of light and therefore a suitable high energy light source had to be optically connected to the fibers. Over the last few years the wide spread commercialization of the high energy light commonly referred to as halogen type lights has greatly reduced the cost of such light source. Contrarly to the structures described in the previously mentioned patents, the present invention thus uses a halogen type of light as its light source.

To further enhance the aesthetical effect provided by the present invention, taking advantage of the fact that the radial glowing occurs on the full length of each fibre, a set of segmented colored disc has also been developed. Although such discs have already been disclosed by previous patents namely U.S. Pat. No. 3,465,139, the invention proposes a set of discs having a specific colour segmentation adapted to further optimize the aesthetically pleasing effect created by the device.

SUMMARY OF THE INVENTION

According to the preferred embodiment of the invention is proposed a lighting device for illuminating a tree, the tree having a trunk and a set of branches extending substantially laterally from it.

The lighting device has a rigid branch made of light conductive material. This rigid branch has a base and a top end and is adapted to extend substantially parallel to the trunk of the tree. The device also has a set of relatively flexible branches made of light conductive material. Each one of these flexible branches has a top end and a base end. The flexible branches are divided into groups of different lengths. Each one of the groups is attached by attaching means to the rigid branch positioned intermediate between its base and top end so that each one of the branches is disposed substantially axially to the rigid branch over a first portion of its length extending between the base end and the attaching means and then branches off in an unrestrained manner extending from the attaching means to its top end.

BRIEF DESCRIPTION OF THE DRAWINGS

An embodiment of the invention will now be described by way of example with reference to the following drawings in which, FIG. 7a is a top view of the segmented colour disc having another colour pattern arrangement, FIG. 9 is a top view of another embodiment of a segmented colored disc, FIG. 10 is a cross sectional view taken along arrow 10—10 of FIG. 9, FIG. 12 is an enlarged view taken inside arrow 12—12 of FIG. 1, and FIG. 13 is a cross-sectional view taken along arrow 13—13 of FIG. 12.

DETAILED DESCRIPTION OF THE PREFERRED EMBODIMENT

Figure 1:
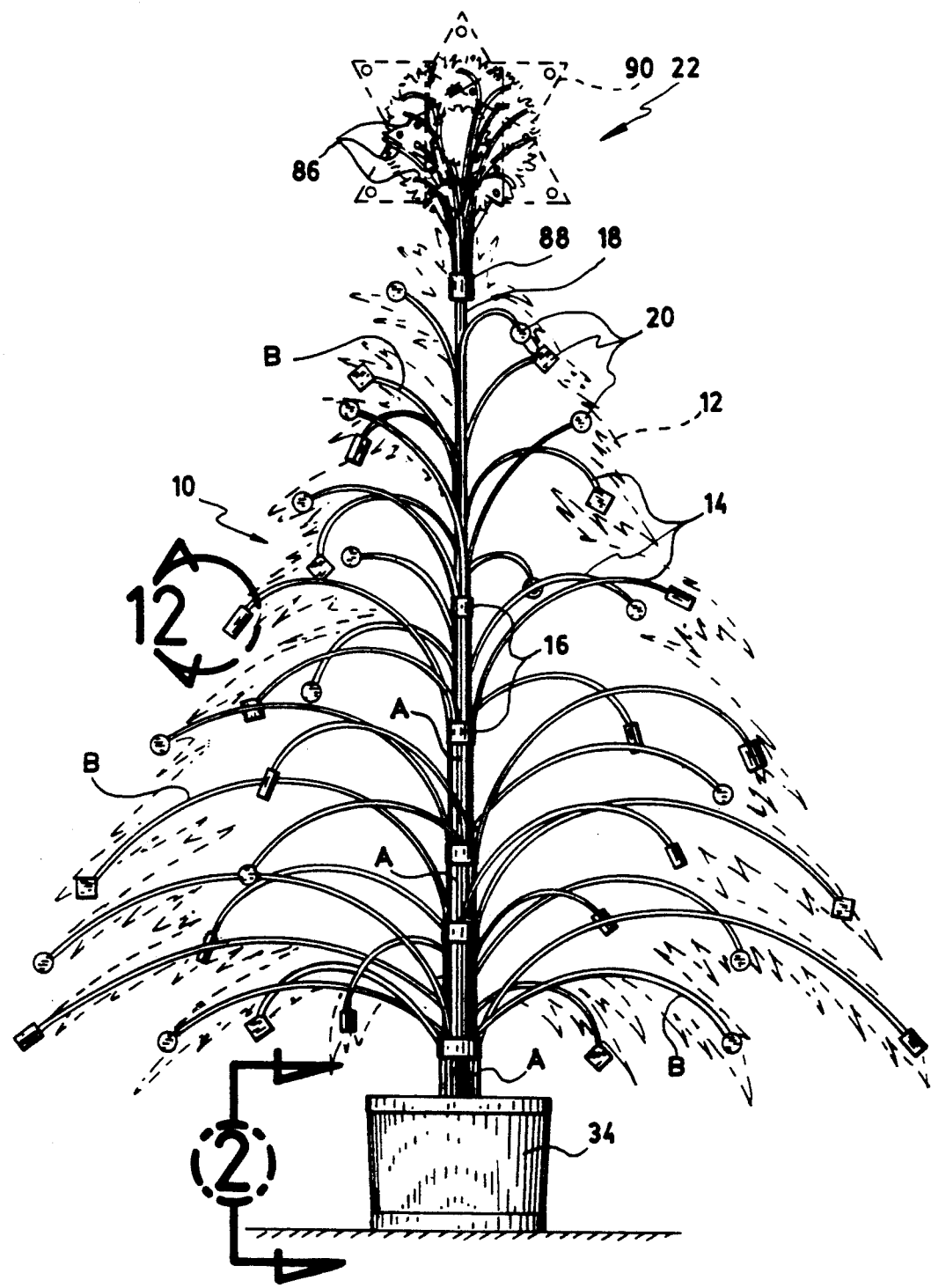
FIG. 1 is a front view of a lighting arrangement embodying the invention mounted in a Christmas tree.

Referring to FIG. 1, there is shown a lighting arrangement 10 mounted on a Christmas tree 12 illustrated in phantom lines. The lighting arrangement 10 comprises a set of relatively flexible branches 14. The branches 14 are subdivided into groups of given length. Each group of branches 14 is attached by a collar 16 to a central rigid supporting branch 18.

Figure 2:
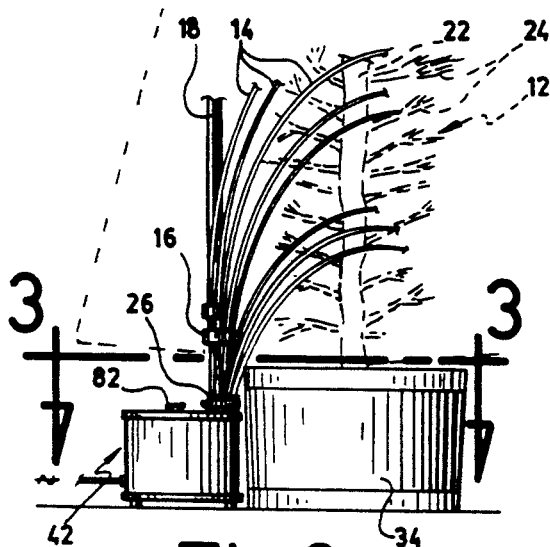
FIG. 2 is a detailed view of the base portion of an embodiment of the invention specifically adapted for use with trees having a large supporting base.

Each one of the flexible branches 14 runs along the rigid branch 18 over a section indicated by the letter A and then branches off in an unrestrained manner over a section indicated by the letter B. A set of translucent terminal bodies 20 are adapted to be mounted at the free end of the branches 14. A top ornament 22 is adapted to be fixed at the top terminal end of the rigid branch 18. The rigid branch 18 is adapted to extend vertically in a position relatively adjacent the stem 22 of the tree 12. As illustrated in FIGS. 1 and 2, the flexible branches 14 which branch off freely from the collars 16 are adapted to be abuttingly supported by the branches 24 of the tree 12 and foliage thereon. Typically, they are thus adapted to adopt a relatively arcuate configuration illustrated clearly in FIG. 1. The branches 14 need not be spread apart. Since they are unrestrained from the point at which they emerge from the respective collar 16, the combination of their own weight, tensile strength and resilience tends to spread them apart.

As illustrated more specifically in FIGS. 2 through 5a, the flexible branches 14 are grouped tightly together around the rigid branch 18 by a gathering base collar 26 provided with a conventional screw tightening mechanism 28. The base collar 26 is adapted to exert an inward radial pressure on the sleeve 30 having an abutting flange 32.

Figure 3:
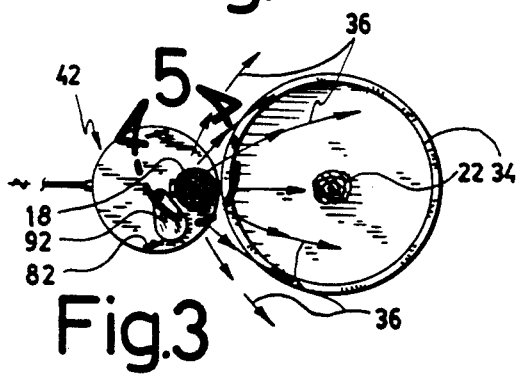
FIG. 3 is a cross sectional view taken along line 3—3 of FIG. 2.
Figure 6:
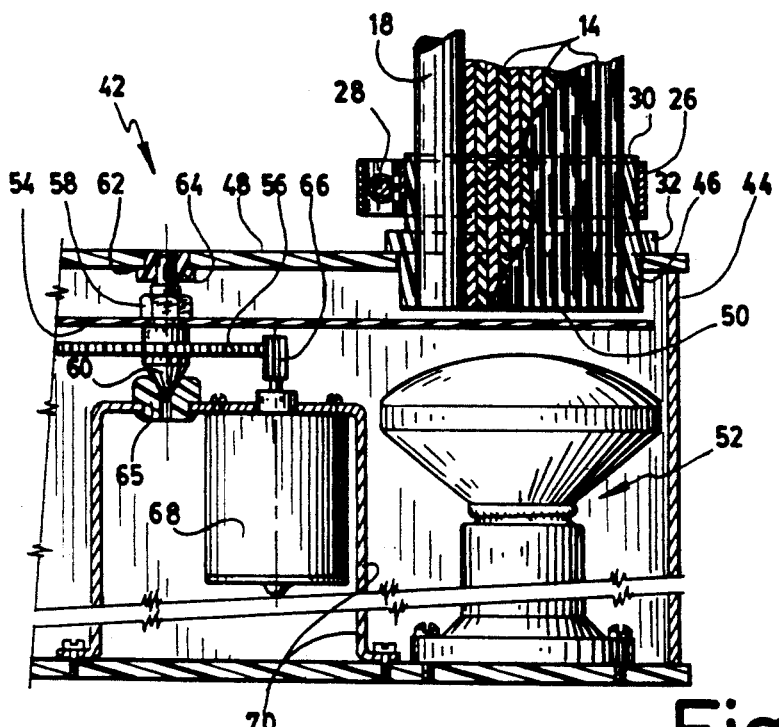
FIG. 6 is a cross sectional view taken along arrow 6—6 of FIG. 5.
Figure 11:
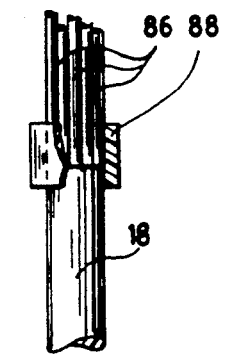
FIG. 11 is an enlarged view taken inside arrow 11—11 of FIG. 1.

As illustrated in FIGS. 2,3 and 6, when a relatively large base support such as a planting pot 34 is used as a support for the stem 22 of tree 12, the rigid branch 18 is positioned eccentrically relative to the groups of flexible branches 14. The majority of the flexible branches 14 being positioned closer to the stem 22, and extending principally in one direction as illustrated by the arrows 36 of FIG. 3.

Figure 2A:
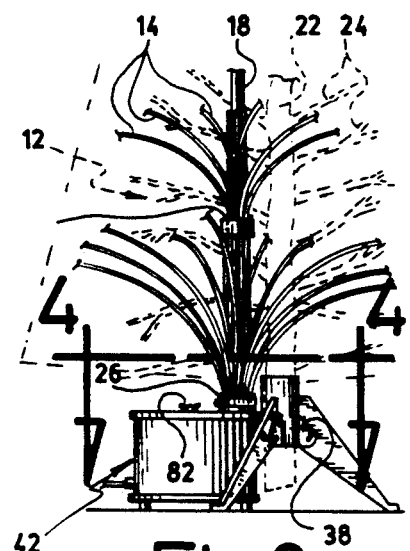
FIG. 2a is a detailed view of the base portion of an embodiment of the invention specifically adapted for use with trees have a small supporting base.
Figure 4:
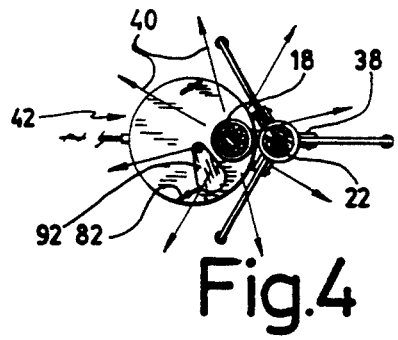
FIG. 4 is a cross sectional view taken along line 4—4 of FIG. 2a, FIG. 5 is an enlarged view taken inside arrow of FIG. 3.
Figure 5:
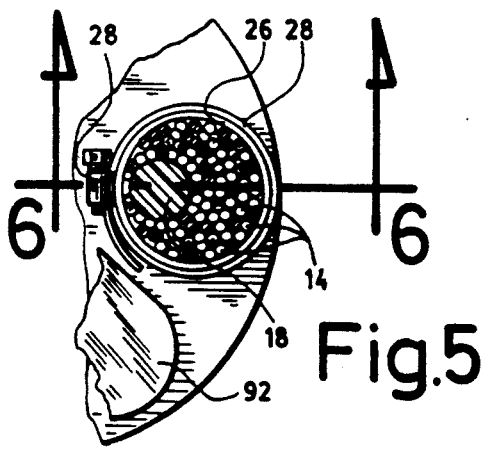
FIG. 5a is an enlarged view taken inside arrow 5a of FIG. 4.
Figure 5A:
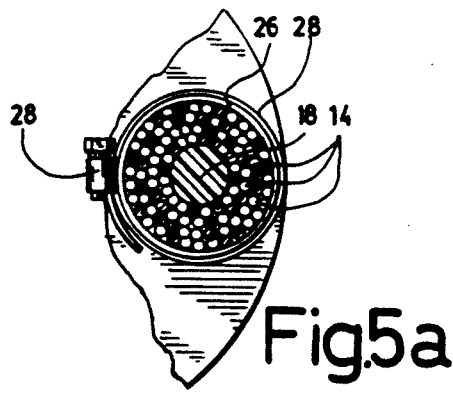

As illustrated in FIGS. 2a, 4 and 5a, when a supporting base having a small diameter such as the tripod type base 38 is used for supporting the stem 22 of the tree 12, the rigid branch 18 which extends vertically adjacent the stem 22 of the tree 12 is positioned centrally with regards to the concentric flexible branches 14. Since the rigid branch 18 is adapted to extend vertically adjacent the stem 22, the flexible branches 14 are adapted to fall unrestrainingly in all directions as indicated by the arrows 40 of FIG. 4. The branches 18 and 14 grouped at their bottom end by the collar 26 are adapted to be supported at the base by a lighting mechanism 42. The lighting mechanism 42 comprises a housing 44 adapted particularly to enclose the light source and the colour changing mechanism.

As illustrated more specifically in FIG. 6, the portion 46 of the sleeve 30 extending below the abutting flange 32 is adapted to be fittingly inserted through an aperture provided in the top plate 48 of the housing 44. All of the fibers 18 and 14 terminate on a flat planner surface 50 so as to form a uniform and for receiving light from the light source 52 as will be described hereinafter.

A colored segmented disc 54 is rotatably mounted adjacent the surface 50 between the light source 52 and the surface 50 so that light emanating from the light source 52 passes through the disc 54 before reaching the surface 50.

The disc 54 is mounted on a shaft formed integrally with a reduction gear 56. The shaft has a threaded portion adapted to receive a bolt 58, a conically tapering bottom end 60 and a cylindrical top end 62. The ends 60 and 62 are adapted to be removably inserted inside a pair of corresponding sleeves 64 and 65 which allow rotation of the shaft. The reduction gear 56 is adapted to engage a driving gear 66 mounted to the drive shaft of the motor 68. The motor 68 is itself mounted to a mounting bracket 70 fixed to the housing 44.

Figure 7:
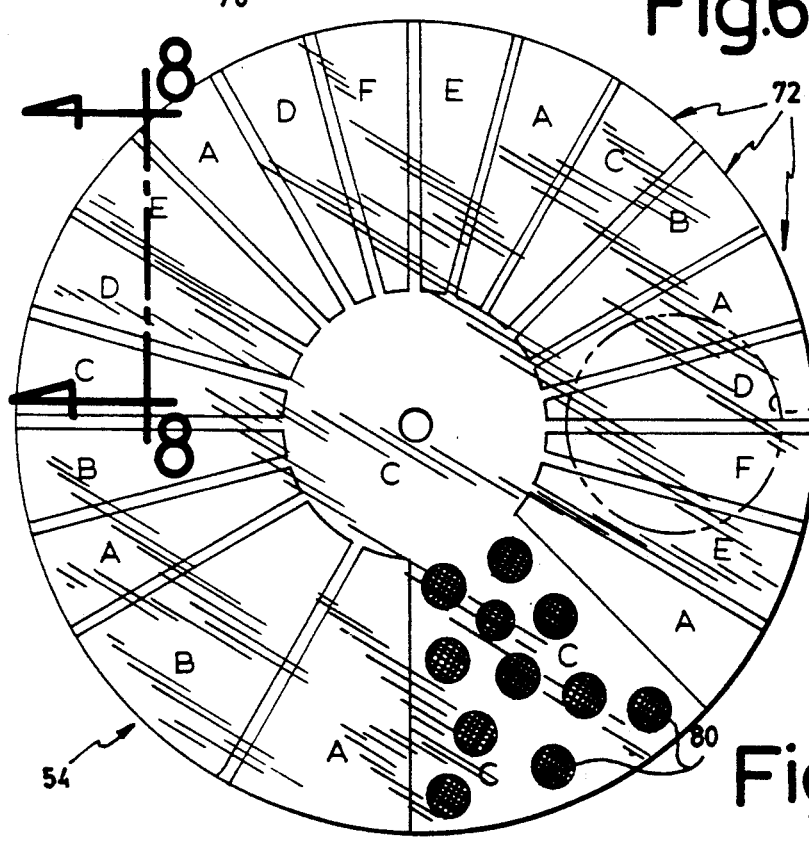
FIG. 7 is a top view of the segmented colour disc used to create changing colour patterns.

As illustrated in FIGS. 7, 7a and 9, the disc 54 which is made of relatively transparent material is provided with a set of colored translucent segments 72. Once the motor 68 is activated thus rotating the disc 54, the colored segments 72 are adapted to pass sequentially between the light source 52 and the surface 50, thus coloring the rays of light emanating from the light source 52 and which will travel up the branches 18 and 14.

The use of a colored disc has been disclosed in patents relating to the same art namely in U.S. Pat. No. 3,465,139. The disc 54 relating to the present invention differs from discs previously disclosed with respect to two aspects. The structural nature of the improve disc and a specific segment pattern which further enhances the asthetical effect provided by the device.

Since the light source 52 is relatively powerful, the disc 54 must be given a structure which will prevent it from melting or warping because of the generated heat. Two structural embodiments have been developed in order to meet the above mentioned criteria without unduly increasing the manufacturing costs.

Figure 8:
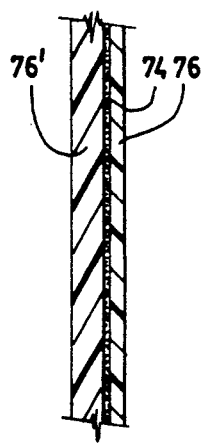
FIG. 8 is a cross sectional view taken along line 8—8 of FIG. 7.

In the first of these two embodiments, illustrated in FIGS. 7 and 8, the disc 54 comprises a sheet of relatively thin material 74 on which the colored segments are printed by a conventional printing process. The sheet 74 is sandwiched between a pair of protective layers 76 and 76' made of relatively heat resistive transparent material.

FIGS. 9 and 10 illustrate a second embodiment for the disc 54. In this embodiment the colored segments 74 are manufactured of relatively flexible material. Each one of the segments 72 is adapted to be snappingly inserted between a pair of retaining prongs 78 extending integrally from the disc 54. The disc is provided with suitably sized apertures 73 extending therethrough.

A first example of a sequential colour pattern is illustrated in FIG. 7 wherein ABDE&F represent segments of various coloration while C represents areas where the disc 54 is transparent and the patched spots 80 represent regions where the sheet 74 is printed in black with this first example of segment pattern, the colour of each segment 72 is constant along the radius of each individual segment 72.

The segment pattern illustrated in FIG. 70 provides another type of branch colour changing sequence. A greater amount of colour variation in the mass of branches is possible for a given rotation of the disc 54. The innovation resides in varying the colorations not only circumferentially but also radially along a given segment 72.

The invention is adapted to allow the user to readily change the segmented disc 54 according to his taste. To change the disc 54, the user merely needs to rotate the wing nut 82 before removing the cover 48. The bolt 58 is then unscrewed and a new disc 54 is positioned before the above mentioned operations are performed in reversed order.

As mentioned previously a set of translucent refractive bodies 20 are adapted to be mounted at the free end of the branches 14. The refractive bodies 20 consist in blocks of various shapes and sizing having a conically tapering aperture 84. The conical aperture 84 is used to fix the refractive bodies 20 to the end portion of the branches 14 and to create a refractive surface which refracts light outside of the bodies 20 thus creating a bulb like effect. Since the material used for both the bodies 14 and the branches 14 is relatively flexible and resilient, to position the bodies 14, the user merely needs to simultaneously push the terminal end of a branch 14 inside the aperture 84 and to rotate approximately $\frac{1}{4}$ to $\frac{1}{2}$ a turn the body 20 relative to the branch 14. The body 20 is thus releasably threaded to the terminal end of a branch 14.

As illustrated in FIG. 1, a top ornament 22 is adapted to be fixed at the top terminal end of the rigid branch 18. The top ornament 22 comprises a set of top ornament flexible branches 86 which are grouped together at their bottom end by a connecting collar 88 and which are inserted at their top end into an ornamental figure such as the star 90 of FIG. 1. The collar 88 is adapted to be fittingly positioned on top of the branch 18 so that the light will travel up through the branches 86.

The core of the invention resides in the optimal sizing of the flexible branches 14 and the choice of the proper light source 52. As mentioned previously, the present invention provides for branches which are flexible yet self supporting and which are adapted to give out a substantially radial diffusion along their entire length as well as an axial diffusion at their terminal end. In the preferred embodiment, the branches 14, 18 and 86 are manufactured from polymethyl methacrylate conventionally known as cast acrylic having a modulus of elasticity approximately $4.5 \times 10$ P.S.I. and a total light transmittance of approximately 92% with a refractive index of approximately 1.49. The branches 14 are typically sized with a diameter varying between sixty thousands of an inch and two hundred and fifty thousands of an inch while the length varies between 30" and 72". When a smaller diameter is used, the light transmitting effect has proven to be unsatisfactory while if a larger diameter is used, the branches are not adapted to bend sufficiently to provide a pleasing spray-like aesthetical effect.

When using branches 14 in the above mentioned range a suitable light source must also be employed. Indeed, since the branches 14 are sized accordingly to generate a substantial amount of radial light emission along their entire length, a substantially powerful light source must be used. A halogen type of lamp provides such a powerful light source and also allows the light source to be focused on the planner surface 50. In the preferred embodiment of the invention, a 12 volts, 36 watts tungsten halogen light is used. The light provides 1,560 footcandles at a distance of 3 feet from the light source. Experimentation has proven that the light source must generate approximately at least 1,000 to 1,500 footcandles at 3 feet in order to provide a proper asthetical effect with branches sized in the above mentioned ranges.

As mentioned previously, another main advantage of the present invention over the prior cited art is its ease of installation. Indeed, the user merely needs to first position the lighting mechanism 42 in a position adjacent the tree supporting base 34. Once the lighting mechanism 42 is in place, the user then pivots a protective cover 92 pivotally mounted adjacent the aperture provided in the top cover 48 of the housing 44. The cover 92 is adapted to close off the aperture in the top cover 48 when the branches 18 and 14 are not being used. Once the cover 92 has been pivoted in a position illustrated more specifically in FIGS. 3, 4 and 5, the user then merely positions the collar 30 with its portion 46 extending into the aperture of the top cover 48 and the abutting flange 32 positioned in an abutting relationship with the top cover 48. Again as stated previously, the branches 14 need not be spread apart since the combination of their own weight, tensile strength and resilience tends to spread them apart. The user only needs to position the branches 14 according to his own taste in order to create a pleasing asthetical effect. Ideally the branches are merely abuttingly supported by the branches 24 of the tree 12. This invention therefore allows the user to readily reposition the branches 14 according to his own taste without undue effort or time consuming operation. In the preferred embodiment, polycarbonate is used to manufacture the disc 54 and transparent tape is used for the collars 16.

The embodiment of the invention in which an exclusive property is claimed are defined as follows:

1. A lighting device for illuminating a tree, said tree having a trunk and a set of branches extending substantially laterally therefrom, said lighting device comprising;
   a rigid branch made of light conductive material, said rigid branch having a rigid branch base and a rigid branch top end, said rigid branch being adapted to extend substantially parallel to the trunk of said tree,
   a set of relatively flexible branches made of light conductive material, each one of said flexible branches having a flexible branch top and a flexible branch base end, said relatively flexible branches being divided into groups of given lengths, each one of said groups being attached by an attaching means to said rigid branch at a position intermediate between said flexible branch top and base end so that each one of said flexible branches is disposed substantially axially relative to said rigid branch over a first portion of its length extending between said flexible branch base end and said attaching means and then branches off in an unrestrained manner over a second portion of its length extending from said attaching means to said flexible branch top end,
   a gathering means for closely gathering said flexible and rigid branches in a fixed position therewithin at the base ends to define a generally planner base termination surface,
   a supporting means for supporting said base end of said flexible and rigid branches,
   a light source positioned in said base supporting means adjacent said planner base termination surface and directed to project light onto said surface,
   said flexible branches having a diameter such that said flexible branches self supportingly project substantially laterally from said rigid branch over said second section of their length thus defining a spray of separate flexible branches and also such that when said light source illuminates said surface, each one of said branches generates a radial diffusion along its entire length and diffuses axially at its top end.

2. A lighting device as recited in claim 1 wherein said flexible branches comprise rods of polymethyl methacrylate having a diameter varying in a range between 60 thousands of an inch and 250 thousands of an inch and a length varying between 30" and 72".

3. A lighting device as recited in claim 1 wherein said rigid branch is a rod having a diameter greater than 25 thousands of an inch.

4. A lighting device as recited in claim 1, wherein said device further comprises a set of translucent reflective bodies mounted on said top end of said flexible branches for reflecting the light axially diffusing from said top end of said flexible branches.

5. A lighting device as recited in claim 4, wherein said reflective bodies comprise a conically tapering aperture and are adapted to be releasably mounted on said top end of said flexible branches with said top end of said flexible branches engaging said conically tapering aperture.

6. A light device as recited in claim 1, wherein a coloured segmented disc is rotatably mounted between said light source and said base termination surface, said disc being mechanically linked to a rotating device, said disc being provided with a set of coloured translucent radial segments wherein these segments being positioned so that the light emanating from said light source passes through said segments of said disc before reaching said base termination surface whereby when said disc is rotated by said rotating device said coloured segments passing sequentially in front of said light source are adapted to colour said light reaching said surface which will travel through said branches.

7. A disc as recited in claim 6, wherein at least one of said segments has a colour pattern which varies radially.

8. A disc as recited in claims 6 or 7, wherein said disc comprises a sheet of relatively thin material on which said colour segments are printed, said sheet being sandwiched between a pair of protective layers made of relatively heat resistant transparent material.

9. A disc as recited in claims 6 or 7, wherein said disc comprises a set of prongs extending integrally therefrom and wherein said segments are made of relatively flexible pieces of material releasably mounted between said prongs.

10. A lighting device as recited in claim 1, wherein said lighting means is an halogen type of light.

11. A lighting device as recited in claim 10, wherein said halogen light generates at least 1,500 candles at a distance of 3 feet.

* * * * *